United States Patent [19]

Brown et al.

[11] Patent Number: 5,395,147
[45] Date of Patent: Mar. 7, 1995

[54] SCOOP APPARATUS FOR FILLING SANDBAGS

[76] Inventors: Steve F. Brown, 411 N. Euclid #8, Fullerton, Calif. 92632; Fred W. Brown, 919 S. Nordica, Anaheim, Calif. 92806

[21] Appl. No.: 189,718

[22] Filed: Feb. 1, 1994

[51] Int. Cl.⁶ .......................... A01B 1/00; B65B 67/12
[52] U.S. Cl. ........................................ 294/55; 294/57; 248/101
[58] Field of Search ...................... 294/1.1, 1.4, 55, 57; 15/257.3, 257.7; 141/108, 109, 319, 331; 248/99, 101

[56] References Cited

U.S. PATENT DOCUMENTS

| | | | |
|---|---|---|---|
| 270,016 | 1/1883 | Chambard | 294/55 X |
| 571,513 | 11/1896 | Davidson | 294/55 X |
| 784,562 | 3/1905 | Hetland | 294/55 X |
| 861,107 | 7/1907 | Goggin | 294/55 X |
| 976,970 | 11/1910 | Wolary | 294/55 X |
| 1,167,782 | 1/1916 | Richards | 294/55 X |
| 1,182,412 | 5/1916 | Olesberg | 294/55 X |
| 2,629,624 | 2/1953 | Nelles | 294/57 |
| 3,136,574 | 6/1964 | Pasquale | 294/57 X |
| 4,149,745 | 4/1979 | Willis | 294/1.4 |
| 5,107,666 | 4/1992 | Rahtican | 294/55 X |

Primary Examiner—Dean J. Kramer
Attorney, Agent, or Firm—Gary Appel

[57] ABSTRACT

A two-handed scoop apparatus for filling conventional sandbags comprises an elongate rigid scoop having a generally semicircular transverse cross section defining an open upper region and open longitudinal end regions and first and second similar, inverted U-shaped, elongate handles, lower end regions of which are pivotally attached to opposing side regions of the scoop so that each handle straddles the open upper region of the scoop, the first and second handles being attached to the scoop in a longitudinally spaced apart relationship near ends thereof. A transverse cross brace is attached across each handle and a clip is fixed to each cross brace for detachably attaching an open end of a conventional sandbag to either end of the scoop so that when the scoop apparatus is moved in a direction away from the sandbag to scoop up sand or other material to fill the sandbag, the sandbag is moved along with the scoop apparatus. the scoop may be at least about 24 inches long, at least about 4 inches high and at least about 7 inches wide. The handles are at least about 32 inches long and can be pivoted to a folded position for storage and portability of the apparatus.

1 Claim, 3 Drawing Sheets

SCOOP APPARATUS FOR FILLING SANDBAGS

BACKGROUND OF THE INVENTION

1. Field of the Invention

The present invention relates generally to the field of hand tools and, more particularly, to hand shovels and, still more particularly, to hand shovels of the types used for filling sandbags for controlling the flow of water and preventing flooding and soil erosion.

2. Background Discussion

Sandbags are widely used throughout the entire world to control the flow of water, especially flood waters and to protect homes, businesses, lives and property from the ravages of flood waters. In the recent flooding in the Midwestern part of the United States in 1993 tens and probably hundreds of thousands of sandbags were used along the swollen Mississippi and other rivers for such purposes.

In addition, sandbags are used to control the flow of water, for example, to prevent destructive soil erosion and mud slides associated with heavy rains, especially after fires have denuded hillsides of soil-holding vegetation.

Obviously in times of such emergency conditions any type of implement capable of carrying and dumping sand or dirt into sandbags is used even if the implements are not efficient at the task and may be difficult and tiring to use. However, when hundreds or thousands of sandbags must be filled in a very short time to avert a disaster, it is important that the implements used to fill sandbags be efficient and comparatively easy to use, for example, even by unskilled homeowners, and are capable of rapidly filling sandbags. In this regard, it can be readily appreciated that if one individual could do the work of two in filling sandbags, the production of filled and ready to use sand bags would be greatly increased and that increased production could, in some cases, spell the difference between losing and saving lives and property.

For these and other reasons, the present inventors have invented an improved scoop apparatus by means of which an individual can easily and rapidly scoop up sand and/or dirt for the filling of sandbags.

SUMMARY OF THE INVENTION

According to the present invention there is provided a two-handed scoop apparatus for filling conventional sandbags. The scoop apparatus comprises an elongate rigid scoop having a generally semicircular transverse cross section defining an open upper region and open end regions, first and second similar, inverted U-shaped, elongate handles, and fasteners pivotally attaching opposing ends of each of the first and second handles to opposing side regions of the scoop so that each handle straddles the open upper region of scoop. The first and second handles are pivotally attached to the scoop in a longitudinally spaced apart relationship, relatively near the open ends of the scoop.

The scoop apparatus further includes first and second transverse cross braces attached across lower regions of respective ones of the first and second handles above the open upper region of said scoop. Further included are means for detachably attaching an open end of a conventional sandbag at one longitudinal end region of the scoop so that when the scoop apparatus is moved in a direction away from the sandbag to scoop up sand or other material to fill the sandbag, the sandbag is moved along with the scoop apparatus and is filled by sand or other material scooped up by the scoop. Preferably the means for attaching a sand bag to the apparatus comprise a clip fastened to each of the transverse cross braces so that a sand bag can be detachably attached at either end of the scoop.

In accordance with a preferred embodiment of the invention, the scoop is formed to be at least about 24 inches in length, at least about 4 inches high and at least about 7 inches wide. In addition, the handles are formed so that they extend upwardly at least about 32 inches from the bottom of the scoop when the handles are positioned perpendicular to a longitudinal axis of the scoop.

It is preferred that the handles are attached to said scoop so that they can be pivoted to a folded condition in which they are relatively parallel to a longitudinal axis of said scoop.

The scoop is easily dragged by its handles into a pile of sand or other material available and useful for filling sandbags, The sand or other material that is scooped up by the scoop is funnelled by the scoop into the attached sandbag which is then detached from the apparatus and its open end is tied closed in the usual manner. Sandbags can thus be quickly, easily and efficiently filled by one person—a second person not being needed to hold open the sandbag being filled.

BRIEF DESCRIPTION OF THE DRAWINGS

The present invention can be more readily understood by a consideration of the following detailed description when taken in conjunction with the accompanying drawings, in which.

In the various FIGS. identical elements and features are given the same reference number.

DETAILED DESCRIPTION OF THE INVENTION

Figure 1:
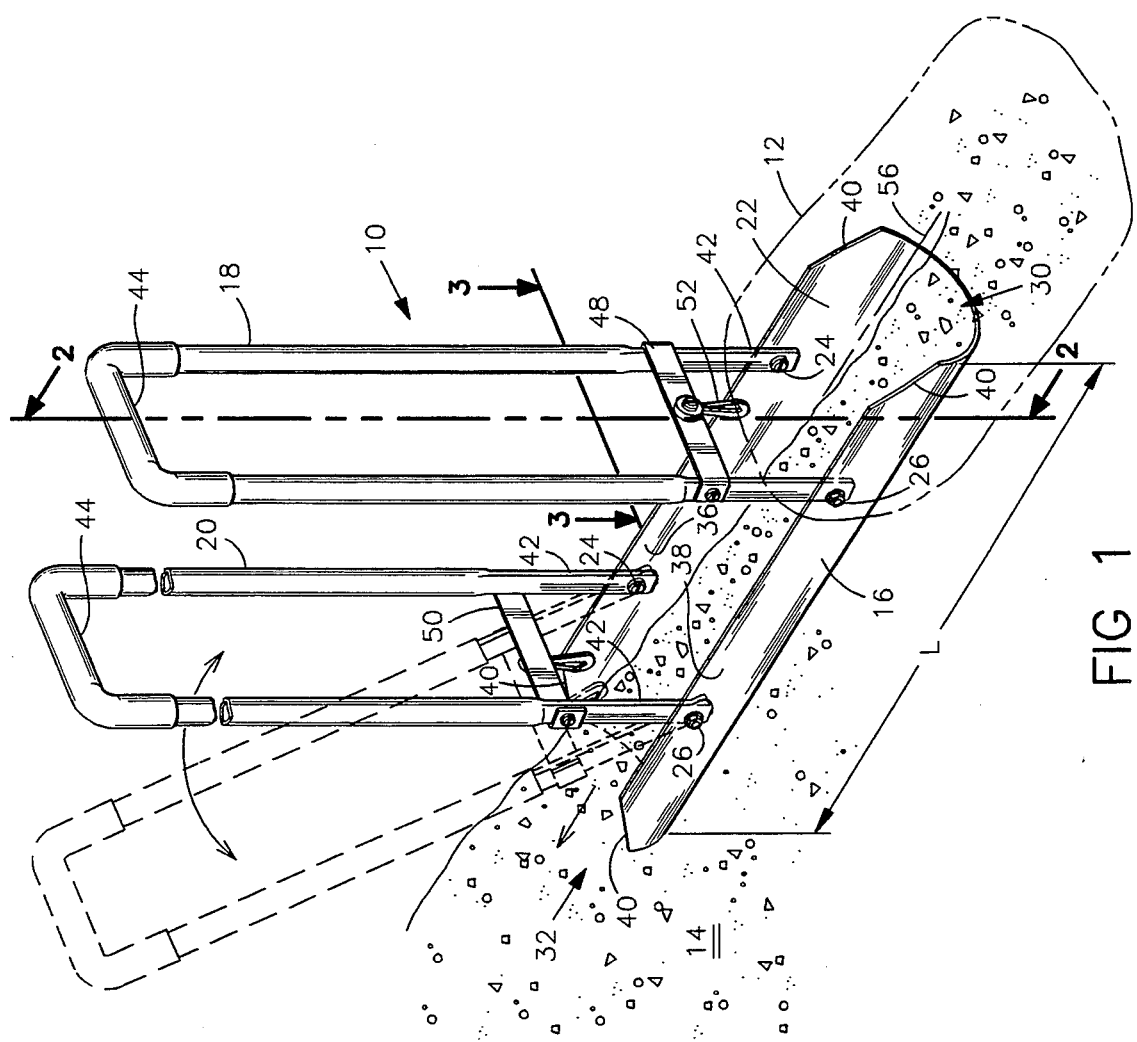
FIG. 1 is a perspective drawing of a two-handled sandbag scoop apparatus in accordance with the present invention showing an elongate scoop portion having a generally semicircular transverse cross section and showing a conventional sandbag attached to the scoop for the filling thereby.

There is shown in FIG. 1 a two-handed scoop apparatus 10 especially constructed for filling a conventional sandbag 12 (shown in phantom lines) with sand or other available material suitable for sandbagging purposes, the sand or other material being shown in a pile 14.

Figure 2:
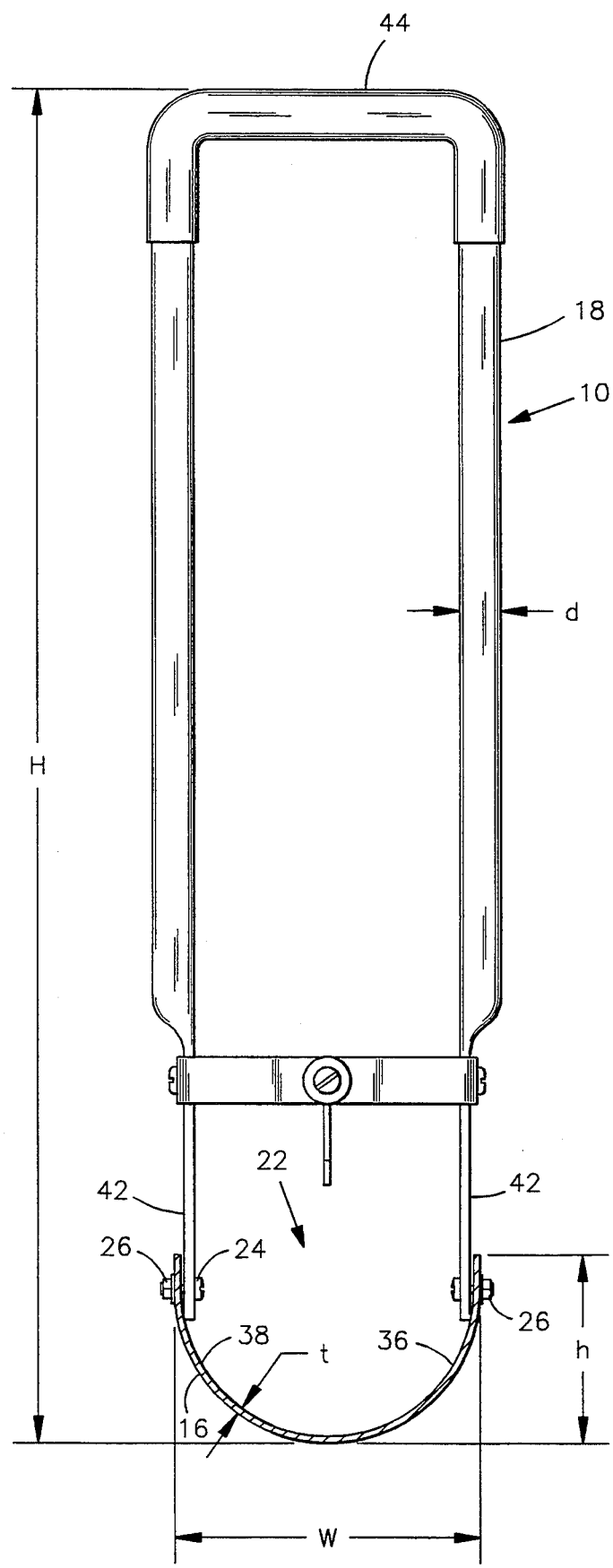
FIG. 2 is a transverse cross sectional drawing taken along line 2—2 of FIG. 1 showing one of the two similar, inverted U-shaped handles pivotally connected to the scoop portion of the apparatus.

Shown comprising scoop apparatus 10 are an elongate scoop 16 and first and second elongate, inverted U-shaped handles 18 and 20, respectively, lower ends of each of which are pivotally attached across an open upper region 22 of the scoop by bolts 24 and nuts 26 (FIGS. 1 and 2). First and second handles 18 and 20 are attached to scoop 16 in a longitudinally spaced-apart relationship such that the first handle is located relatively near a first open end 30 of the scoop and second handle 20 is located relatively near a second open 32 of the scoop.

Preferably scoop 16 is constructed having a generally semicircular transverse cross section (FIG. 2) except that it may have flat, opposite vertical side regions 36, 38 to which first and second handles 18 and 20 are attached.

Without any limitation intended or implied, it has been found advantageous that scoop 16 has an axial length, L, of at least about twenty-four (24) inches, a width, W, of at least about seven (7) to eight (8) inches (FIG. 2), and a height, h, of at least between about four (4) and five (5) inches, and may have a wall thickness, t, of about one-sixteenth (1/16) to about one-eights (⅛). To enable open ends 30 and 32 of scoop 16 to be dug into sand pile 14, end regions 40 of the scoop may be beveled as depicted in FIG. 1.

Depending upon its intended use, scoop 16 can, for example, be constructed from a strong sheet metal, such as galvanized steel or even stainless steel if scoop apparatus 10 is to be used over extended periods of times or used many different times, for example, by fire departments, forestry services and homeowners in areas subject to flooding. On the other hand, for a short time use or if apparatus 10 is to be considered to be disposable after a short period of use, or, for example, is intended to be given to volunteers or homeowners by fire departments, scoop 16 may be constructed by injection molding of a tough plastic material, such as PVC or ABS.

Handles 18 and 20 are preferably identical in shape and may be advantageously constructed of rigid metal (for example, aluminum or stainless steel) tubing having an outside diameter, d, of between about one-half (½) inch and about one (1) inch (FIG. 2). Lower end regions 42 of each tubular handle 18 and 20 are flattened to facilitate attachment of the handles to scoop 16. Gripping regions 44 of each handle 18 and 20 may, as depicted in FIGS. 1 and 2, be coated with a non-slip and-/or cushioning material, such as rubber orENDFIELD neoprene tubing that is slipped over the handles, or such as a silicone rubber coating applied by a conventional dipping process. Handles 18 and 20 preferably have a length such that their height, H, above the bottom of scoop 16 is, when the handles are upright, of about twenty nine (29) or thirty (30) inches (FIG. 2).

Figure 4:
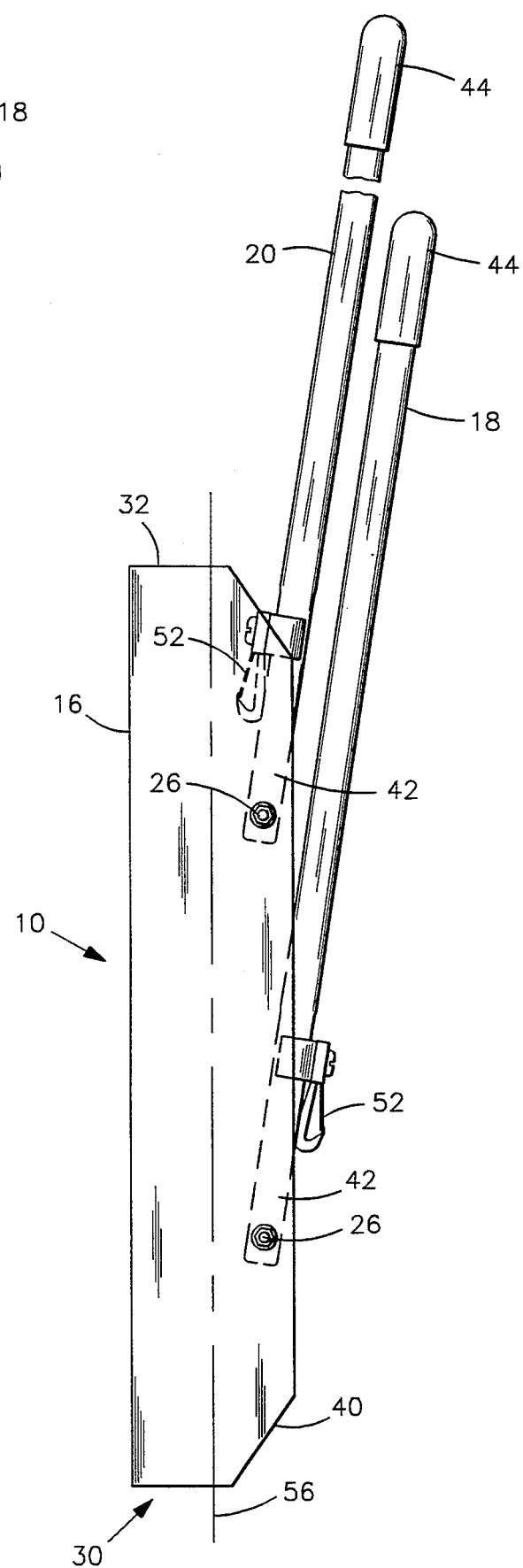
FIG. 4 is a side elevation view of the apparatus of FIG. 1 showing the two handles in a pivoted carrying position.

First and second rigid, transverse cross braces 48 and 50 are connected across lower regions of respective first and second handles 18 and 20, several inches above open upper region 22 of scoop 16 (FIG. 1) to stiffen the handles and prevent the scoop from flattening out or collapsing from side to side during use. Ends of cross braces 48 and 50 may be riveted or otherwise securely fastened to handles 18 and 20. Cross braces 48 and 50 are located so that respective handles 18 and 20 can be folded down against scoop 16 for carrying or storing purposes, with the handles generally parallel with a longitudinal axis 56 of the scoop (FIG. 4).

Figure 3:
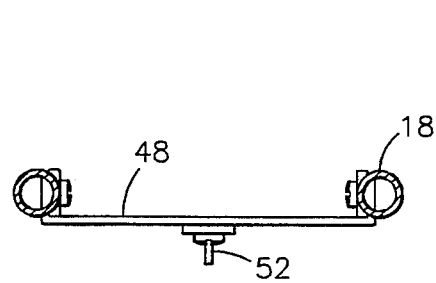
FIG. 3 is a transverse cross sectional drawing taken along line 3—3 of FIG. 1 showing a transverse cross brace on one of the two handles.

Each cross brace 48 and 50 has fixed to it, in transverse central region, a hook 52 (FIGS. 1, 3 and 4) for detachably attaching sandbag 12. Hooks 52 may be simple bent pieces of strong wire or may comprise a spring-loaded latching hook similar to that used on dog leashes for positive retaining of sandbag 12 to scoop apparatus 10.

In use, sandbag 12 is hooked onto one of hooks 52 and scoop 16 is pulled or dragged by handles 18 and 20 into sand pile 14 (FIG. 1) to fill the scoop with sand. Handles 18 and 20 may be pivoted downwardly, as shown for handle 20 in phantom lines, for a good pulling action. If necessary, after scoop 16 is filled with sand, it is tilted upwardly to discharge the sand into sandbag 12. After sandbag 12 is filled, it is unhooked from its hook 52 and tied closed in a conventional manner, for example, with twine or wire.

In this manner, sandbags 12 are easily and quickly filled by one person, as opposed to the usual method of shoveling sand into sandbags, which ordinarily requires one person to do the shoveling and another person to hold the sandbag open for filling.

There has been described and illustrated a two handled scoop apparatus, which is especially adapted for filling sandbags, for purposes of illustrating the manner in which the invention may be used to advantage. It is, however, to be appreciated that the invention is not limited thereto. Therefore, any and all variations and modifications that may occur to those skilled in the applicable art are to be considered as being within the scope and spirit of the claims as appended hereto.

What is claimed is:

1. A two-handed scoop apparatus for filling conventional sandbags, said scoop apparatus comprising:

a. an elongate rigid scoop having a generally semicircular transverse cross section defining an open upper region and open longitudinal end regions, said scoop being at least about 24 inches long, at least about 4 inches high and at least about 7 inches wide, b. a first and second similar, generally inverted U-shaped, elongate handles, the lower end regions of said handles being pivotally attached to opposing side regions of said scoop so that each of said handles straddle said open upper region of said scoop, said first and second handles having a first and second rigid transverse cross braces attached across lower regions of respective handles above said open upper region of said scoop, said handles being attached to said scoop in a longitudinally spaced apart relationship with each of said handles being attached to the scoop relatively adjacent to one of the open ends of said scoop, said handles being attached to said scoop so that the handles can be pivoted to a folded condition in which the handles are relatively parallel to a longitudinal axis of said scoop; and c. a first clip attached to said first transverse cross brace and a second clip attached to said second transverse cross brace for detachably attaching an open end of a conventional sandbag at a selected longitudinal end region of said scoop so that when the scoop apparatus is moved in a direction away from the sandbag to scoop up sand or other material to fill the sandbag, the sandbag is moved along with the scoop apparatus.

* * * * *